A. DANISON.
CORN POPPER.
APPLICATION FILED DEC. 26, 1911.
1,067,226.
Patented July 8, 1913.
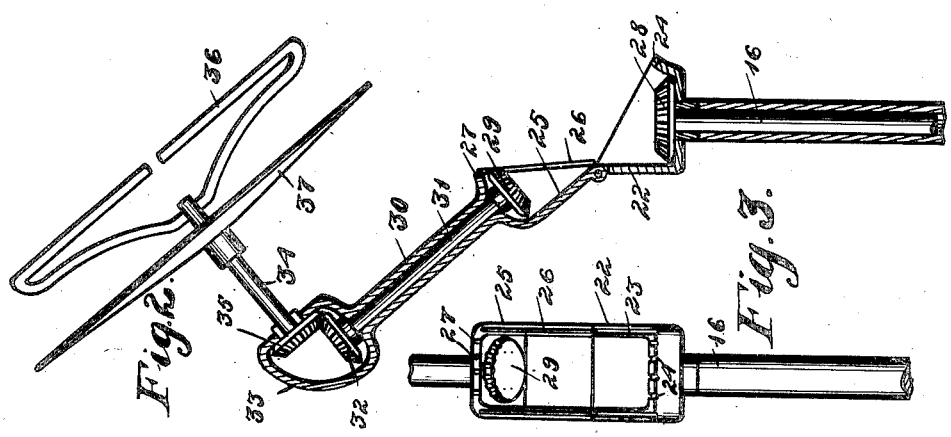
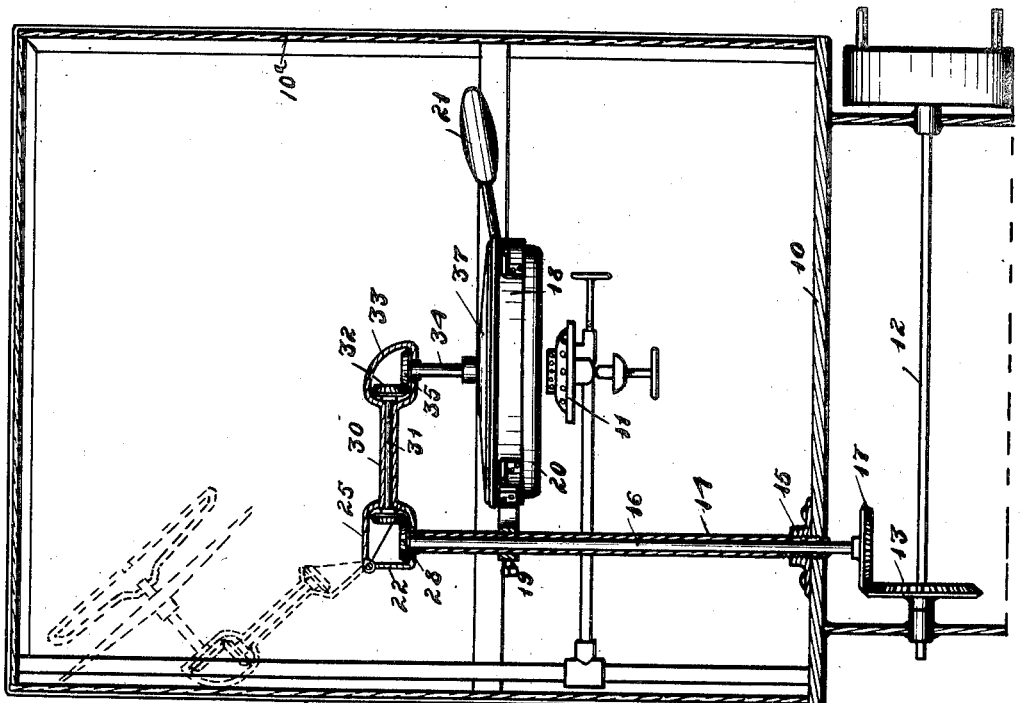
Witnesses.
W. A. Loftus.
F. C. Caswell
Inventor.
Arthur Danison.
by J. Ralph Dwight atty.

UNITED STATES PATENT OFFICE.

ARTHUR DANISON, OF BLUE EARTH, MINNESOTA.

CORN-POPPER.

1,067,226.  Specification of Letters Patent.  Patented July 8, 1913.

Application filed December 26, 1911. Serial No. 667,987.

*To all whom it may concern:*

Be it known that I, ARTHUR DANISON, a citizen of the United States, residing at Blue Earth, in the county of Faribault and State of Minnesota, have invented a certain new and useful Corn-Popper, of which the following is a specification.

My invention relates to that class of corn poppers in which a rotary agitator is provided in a corn popping pan for the purpose of stirring the corn and preventing it from adhering to the pan and becoming scorched.

My object is to provide a machine of this class in which the stirring mechanism and the pan may all be firmly and securely supported by an upright tube resting on the bottom of the machine frame in order to provide a strong and durable support for these parts without having them attached to the glass inclosed superstructure on top of the frame.

My object is to provide a device of this kind of simple, durable and inexpensive construction in which the stirrer and the cover for the pan are both supported from above the pan and so arranged that they may be quickly and easily jointly swung upwardly and outwardly to position away from the pan and when so moved the stirring mechanism will be thrown out of gear automatically and will be automatically placed in gear when returned to normal position over the pan.

My invention consists in certain details, in the construction, arrangement and combination of the various parts of the device, whereby the objects contemplated are attained, as hereinafter more fully set forth, pointed out in my claims and illustrated in the accompanying drawings, in which:

Figure 1 shows a sectional view of a corn popping machine having my improvement applied thereto; the dotted lines in said figure show the stirrer and the pan cover in their elevated positions. Fig. 2 shows an enlarged, detail, sectional view of the stirring supporting and operating mechanism, the stirrer being shown in its elevated and inoperative position, and Fig. 3 shows a side view of the stirrer supporting arm at the point where it is jointed, the hinged portion being shown in open position.

Referring to the accompanying drawings, I have used the reference numeral 10 to indicate the main frame of a corn popping machine of ordinary construction, and 10$^a$ the glass inclosed superstructure on top of the main frame. Supported within the frame is a gasolene burner 11. The machine is also provided with a power shaft 12 which may be operated by a spring motor or in any ordinary manner. On the power shaft is a beveled pinion 13. The parts just described are of the ordinary construction and of themselves form no part of my present invention.

Arranged on the main frame 10 is a tubular standard 14 mounted in a base 15. Within this standard is a rotary shaft 16 having a beveled pinion 17 at its lower end to mesh with the pinion 13. This tubular standard serves to support the circular rim 18 which is adjustably fixed to the standard by means of a bracket 19. This rim is designed to detachably support a pan 20 having a handle 21, said pan being in position directly over the gasolene burner 11. At the top of the tubular standard 14 is a two-part gear case comprising a lower member 22 fixed to the top of the tubular standard 14 and having its sides inclined downwardly and forwardly toward the corn popping pan. These side edges are preferably provided, as shown in Fig. 3, with grooves 23. The lower forward edge of the part 22 is also preferably notched at 24, as shown in Fig. 3. Hinged to the rear upper end of the part 22 is a mating member 25 of the gear case. Its side edges are shaped to fit against the side edges of the part 22 and they are provided with rounded ribs 26 to fit into the grooves 23. The forward edge of the member 25 is also provided with ribs 27 to enter the notches 24. On top of the shaft 16 is a beveled gear wheel 28 within the gear case member 22 and arranged within the gear case member 25 is a beveled gear wheel 29. These parts are so arranged that when the gear case member 25 is in its closed position, as shown in Fig. 1, the beveled gear wheels 28 and 29 are in mesh with each other and the ribs and grooves on said parts will be in coacting positions to thereby prevent lateral movement of the upper gear case member relative to the lower one. However when the upper gear case member is raised to position as shown in Fig. 2, the gear wheels will be out of mesh. Formed integral with the upper member 25 of the gear case is a tubular arm 30 in which is rotatably mounted a shaft 31 which has the beveled pinion 29 fixed to one end and another beveled pinion 32 fixed to its other end. Surrounding the beveled pinion 32 is a gear case 33 and mounted therein is a shaft 34 at right angles to the shaft 31 and provided with a beveled pinion 35 in mesh with the beveled pinion 32. Fixed to the end of the shaft 34 is a corn popper stirrer 36 and slidingly mounted on the shaft 34 is a pan cover 37.

Attention is directed to the extreme simplicity of my improved device and to the fact that the entire stirring mechanism and the pan itself are all supported upon a single standard. All of the gear wheels are incased and protected and a device is provided of extreme strength and rigidity. The cover 37 is arranged to freely slide up and down so that if the corn within the pan increases in bulk it can readily and easily raise the cover.

The power shaft 12 may be operated continuously during the operation of popping corn. Any time that the operator desires to inspect the interior of the pan he simply grasps the arm 30 or the gear case 33 at its end and elevates it and moves it rearwardly, whereupon it will rest against the back of the frame 10, as shown by dotted lines in Fig. 1. As soon as the stirrer is elevated to a point above the pan the gear wheels 29 and 28 will be thrown out of mesh so that the stirrer will remain inoperative. When in this position the stirrer and the cover are widely separated from the pan and there is absolutely no obstruction above the top of the pan that would interfere with the removal of the pan and its contents or with access to the interior of the pan in any way. Then when the arm 30 is returned it will be stopped in proper position and rigidly held in said position and as soon as the stirrer enters the pan the gear wheels 29 and 28 will be immediately thrown into mesh and the stirrer will start its movement. It is to be noted that the pan itself is to be entirely free from all attachments so that it may be readily and easily removed or replaced and may be easily cleaned, and may be readily and easily adjusted vertically upon the standard 11 so that it may be spaced the proper distance apart from the gasolene burner.

In a device of this kind it is very desirable that the heavy pan and the stirrer operating mechanism be supported upon the main frame and not upon the glass inclosed superstructure above the main frame, it being understood that machines of this class are usually provided with wheels and are moved about from place to place and if the weight of the pan and stirring mechanism is to be supported on the superstructure the same must be made correspondingly heavy and expensive, whereas, with my improvement it is only necessary to have a strong and rigid base frame as all of these parts are firmly and securely carried by the base frame.

I claim as my invention:

1. In a device of the class described, an upright tubular bearing, a shaft rotatably mounted therein, a beveled pinion on the upper end of said shaft, a gear case member on said tubular bearing, a second gear case member hinged to said first member, a shaft rotatably mounted in said second gear case member, a beveled pinion thereon, designed to mesh with said first pinion in one position of the movement of said last named shaft at a point below the hinge point thereof, so that when said second shaft is elevated, the pinions are thrown out of gear.

2. In a device of the class described, an upright tubular bearing, a shaft rotatably mounted therein, a beveled pinion on the upper end of said shaft, a gear case member on said tubular bearing, a second gear case member hinged to the upper edge of said first member, a shaft rotatably mounted in said second gear case member at a point spaced away from the hinge point thereof, a beveled pinion on said second shaft, designed in one position of the movement of said second shaft to mesh with said first pinion, at a point below the level of said hinge point, and in another position of such movement to be out of mesh with said first pinion, said gear case members having portions designed to engage each other and thereby limit the downward movement of said second shaft.

3. In a device of the class described, the combination of a tubular upright standard, a shaft rotatably mounted therein, a beveled pinion on top of the shaft, an arm hinged to said standard, a shaft in said arm, a beveled pinion on the latter shaft capable of meshing with the first mentioned pinion, a stirrer shaft mounted in the other end of said arm, and means for operatively connecting it with the second mentioned shaft, said parts being so arranged that the arm containing the stirrer shaft may be elevated and the gear wheels between the first and second shafts may be separated.

4. In a device of the class described, an upright tubular bearing, a shaft rotatably mounted therein, a beveled pinion on the upper end of said shaft, a gear case member on said tubular bearing, a second gear case member hinged to said first member, a shaft rotatably mounted in said second gear case member, a beveled pinion thereon, designed to mesh with said first pinion in one position of the movement of said last named shaft at a point below the hinge point thereof, so that when said second shaft is elevated, the pinions are thrown out of gear, and a stirrer shaft operatively connected with said second described shaft and designed in one position of the movement of said second shaft to stand in vertical position.

5. In a device of the class described, the combination of a pan, an upright at the side of the pan extended to a point above it, an arm, means for hinging said arm to the upright to permit said arm to swing in a vertical plane and in one position of its movement to extend across the pan, a stirrer shaft carried by said arm, a stirrer thereon designed to enter the pan, and operating means carried by the upright and arm for actuating the stirrer shaft, said means including gearing devices between the upright and the arm, the adjacent gearing devices on the upright and the arm, being carried at such points thereon that they are disconnected when the said arm is elevated.

6. In a device of the class described, the combination of a standard, a two-part gear case at the top of the standard, said gear case being divided along a downwardly inclined line, and said members being hinged together at their upper edges, a shaft within the upright standard, a gear thereon within the gear case, an arm fixed in position relative to the upper member of the gear case, a shaft in said arm, a gear wheel on said shaft within the gear case and capable of meshing with the other gear wheel in the gear case, and designed to be moved out of mesh with the other gear wheel when said upper gear case member is moved upwardly on its hinge point, a stirrer shaft carried by the arm and operatively connected with the shaft in the arm.

7. In a device of the class described, the combination of a stationary pan, an upright at the side of the pan extended to a point above it, an arm hinged to the upright and extended across the pan, a stirrer shaft carried by said arm, a stirrer thereon designed to enter the pan, and operating means carried by the upright and arm for actuating the stirrer shaft, said means including gearing devices between the upright and the arm, which gearing devices are disconnected when the said arm is elevated.

8. In a device of the class described, the combination of a standard, a two-part gear case at the top of the standard, said gear case being divided along a downwardly inclined line, and said members being hinged together at their upper edges, a shaft within the upright standard, a gear thereon within the gear case, an arm fixed in position relative to the upper member of the gear case, a shaft in said arm, a gear wheel on said shaft within the gear case and capable of meshing with the other gear wheel in the gear case, a stirrer shaft carried by the arm and operatively connected with the shaft in the arm, said parts being so arranged as to disconnect said gear wheel when the arm is elevated.

9. The combination with a pan, of a tubular upright at the side of the pan extended to a point above it, a gear case member at its top having its sides extended downwardly and toward the center of the pan, a second gear case member hinged to the first at its upper corner and having its sides shaped to fit the sides of the first mentioned gear case member, a tubular arm fixed in position relative to the second gear case member, a stirrer shaft at the outer end of said arm, a shaft within the arm, a shaft within the upright standard, and gear wheels on the two latter shafts within said gear case in mesh with each other when the arm is in a substantially horizontal position and out of engagement with each other when the arm is in an elevated position.

10. In a device of the class described, the combination of a tubular upright, a pan supported by said upright, a shaft extended through said upright, a gear case member at the top of the upright, a second gear case member hinged to the first and capable of swinging upwardly in a direction away from the pan, a tubular arm fixed in position relative to the second gear case member, a gear case formed on the outer end of said arm in position above the center of the pan, a shaft in said arm, beveled gear wheels on said shafts in mesh with each other when the arm is in a substantially horizontal position and out of mesh with each other when the arm is elevated, a stirrer shaft mounted in the gear case at the outer end of the arm, a stirrer thereon, and beveled gear wheels within the gear case on the outer end of the arm in mesh with each other and fixed to the stirrer shaft and the shaft within the arm, for the purposes stated.

11. In a device of the class described, the combination of a tubular upright, a pan supported by said upright, a shaft extended through said upright, a gear case member at the top of the upright, a second gear case member hinged to the first and capable of swinging upwardly in a direction away from the pan, a tubular arm fixed in position relative to the second gear case member, a gear case formed on the outer end of said arm in position above the center of the pan, a shaft in said arm, beveled gear wheels on said shafts in mesh with each other when the arm is in a substantially horizontal position and out of mesh with each other when the arm is elevated, a stirrer shaft mounted in the gear case at the outer end of the arm, a stirrer thereon, beveled gear wheels within the gear case on the outer end of the arm in mesh with each other and fixed to the stirrer shaft and the shaft within the arm, and a pan cover slidingly mounted upon the stirrer arm.

12. In a device of the class described, the combination of a tubular upright, a pan supported by said upright, a shaft extended through said upright, a gear case member at the top of the upright, a second gear case member hinged to the first and capable of swinging upwardly in a direction away from the pan, said gear case members having their sides inclined along lines extending downwardly and toward the center of the pan, the meeting edges of said gear case members being provided with coacting ribs and grooves to prevent lateral movement of the gear case member, a tubular arm fixed in position relative to the second gear case member, a gear case formed on the outer end of said arm in position above the center of the pan, a shaft in said arm, beveled gear wheels on said shafts in mesh with each other when the arm is in a substantially horizontal position and out of mesh with each other when the arm is elevated, a stirrer shaft mounted in the gear case at the outer end of the arm, a stirrer thereon and beveled gear wheels within the gear case on the outer end of the arm in mesh with each other and fixed to the stirrer shaft and the shaft within the arm, for the purposes stated.

Des Moines, Iowa, August 13, 1910.

ARTHUR DANISON.

Witnesses:
MARY WALLACE,
ELIZABETH SKAHILL.